K. LANDA.
BALANCING DEVICE FOR VEHICLE WINDOWS.
APPLICATION FILED MAR. 19, 1912.

1,032,149.

Patented July 9, 1912.

Witnesses:
F. C. Schroder
A. Reynolds

Inventor:
Karl Landa
per Lawrence Lauquer
Attorney.

UNITED STATES PATENT OFFICE.

KARL LANDA, OF VIENNA, AUSTRIA-HUNGARY.

BALANCING DEVICE FOR VEHICLE-WINDOWS.

1,032,149.　　　　　Specification of Letters Patent.　　Patented July 9, 1912.

Application filed March 19, 1912.　Serial No. 684,746.

*To all whom it may concern:*

Be it known that I, KARL LANDA, a subject of the Emperor of Austria-Hungary, residing at 35 Siepensterngasse, Vienna, in the Empire of Austria-Hungary, have invented certain new and useful Improvements in and Relating to Balancing Devices for Vehicle-Windows, of which the following is a specification.

The present invention relates to windows for vehicles in which the slidably arranged window is connected with a spring-controlled roller, the spring of which is cocked by a gear wheel actuated by the sliding of the window.

The invention resides in the fact that ratchet mechanism which is released by centrifugal force is connected with the rotatably mounted roller. The provision of this ratchet mechanism permits of making the window case very compact as the necessity for balancing the window by a counterweight disappears and the window is held at any desired height without special fixing means, while when the ratchet mechanism is released by a sudden jerk it is automatically returned to the closed position.

Figure 1:
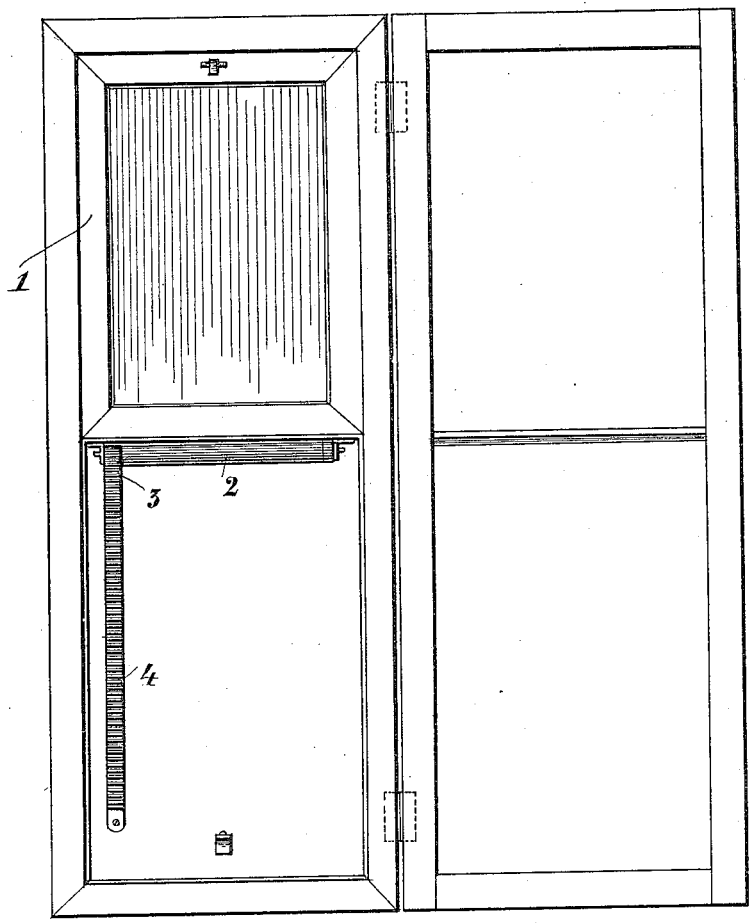
Figure 2:
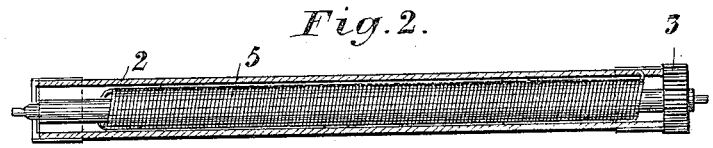
Figure 3:
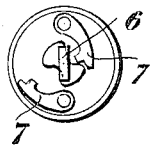

In the drawing the object of the invention is illustrated by way of example in elevation in the open condition in Fig. 1. Fig. 2 shows the operating mechanism in longitudinal section and Fig. 3 shows it in front elevation.

On the window 1 which is slidable in the usual manner a spring-controlled roller 2 of known construction is arranged.

In the present construction the spindle of the roller 2 is fixed and the casing of the roller runs freely upon it. A toothed wheel 3 is connected with the casing and when the window is slid, rolls on a rack 4 provided in the window case thereby rotating the roller casing in opposition to the action of a spring 5 acting on the spindle or the casing (Fig. 2). Pawl and ratchet mechanism 6, 7 (Fig. 3) is connected with the casing and is released in the known manner by centrifugal force, this mechanism retains the casing at different tensions of the spring 4.

The operation is as follows:—On sliding the window the roller casing 2 is rotated in opposition to the action of the spring 5 and the pawls 7 mounted on the end of the casing engage in a ratchet wheel 6 connected with the spindle thereby retaining the casing and with it the window in various positions. If the window is to be closed it is only necessary to depress it slightly so that the pawls 7 are disengaged whereupon on releasing the window it springs back into the closed position under the influence of the spring 5, the pawl 7 being prevented from snapping into the recesses in the disk 6 owing to the centrifugal force produced.

What I claim and desire to secure by Letters Patent of the United States is:—

A window for vehicles having in combination with the slidable window, a rack attached to the window case, a spring roller connected with the window, a toothed wheel on one end of the casing of said roller and adapted to run on said rack, a ratchet wheel connected with one end of the roller spindle and pawls mounted on the roller casing adapted to engage in said ratchet wheel to secure the window in any desired open position, and to be disengaged upon depression of said window with a jerk, and held disengaged by centrifugal action while the window is closing.

In testimony whereof I affix my signature in presence of two witnesses.

KARL LANDA.

Witnesses:
ADOLF URBANTSCHITSCH,
AUGUST FUGGER.

Copies of this patent may be obtained for five cents each, by addressing the "Commissioner of Patents, Washington, D. C."